US009654682B2

(12) United States Patent
Ohtani

(10) Patent No.: US 9,654,682 B2
(45) Date of Patent: May 16, 2017

(54) IMAGING APPARATUS

(71) Applicant: Panasonic Intellectual Property Management Co., Ltd., Osaka (JP)

(72) Inventor: Yoshihiro Ohtani, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 68 days.

(21) Appl. No.: 14/723,307

(22) Filed: May 27, 2015

(65) Prior Publication Data

US 2015/0350528 A1 Dec. 3, 2015

(30) Foreign Application Priority Data

May 27, 2014 (JP) ................................ 2014-109292
Jan. 21, 2015 (JP) ................................ 2015-009805

(51) Int. Cl.
*H04N 5/232* (2006.01)
*H04N 5/225* (2006.01)
*G03B 3/10* (2006.01)

(52) U.S. Cl.
CPC ........... *H04N 5/23212* (2013.01); *G03B 3/10* (2013.01); *H04N 5/2254* (2013.01); *H04N 5/23296* (2013.01)

(58) Field of Classification Search
CPC ............. H04N 5/23212; H04N 5/2254; H04N 5/23296; G03B 3/10
See application file for complete search history.

(56) References Cited

U.S. PATENT DOCUMENTS 7,768,572 B2 * 8/2010 Park ................... G06K 9/00604 348/240.3
2002/0135693 A1 * 9/2002 Ohkawara ............. G02B 7/102 348/347

FOREIGN PATENT DOCUMENTS

JP 2004-015595 A 1/2004
JP 2010-072950 A 4/2010

* cited by examiner

*Primary Examiner* — Daniel M Pasiewicz
(74) *Attorney, Agent, or Firm* — McDermott Will & Emery LLP

(57) ABSTRACT

An imaging apparatus according to the present disclosure includes: a focus lens, a motor for driving the focus lens, an origin detection unit for detecting an arrival of the focus lens at a reference position, a drive amount detection unit for detecting an amount of drive of the focus lens driven by the motor, and a controller for recognizing a position of the focus lens based on an output from the drive amount detection unit and for controlling the position of the focus lens. The controller receives a detection signal from the origin detection unit during driving the focus lens, and determines an occurrence of step-out of the motor based on both the received detection signal and the position of the focus lens recognized by the controller.

3 Claims, 7 Drawing Sheets

IMAGING APPARATUS

RELATED APPLICATIONS

This application claims the benefit of Japanese Patent Application No. 2014-109292, filed on May 27, 2014 and Japanese Patent Application No. 2015-009805, filed Jan. 21, 2015, the disclosures of which Applications are incorporated by reference herein.

BACKGROUND

1. Field

The present disclosure relates to imaging apparatuses which each have a focus lens driven by a motor.

2. Description of the Related Art

A conventional imaging apparatus, such as a digital camera, drives its focus lens by using a motor, in an auto-focusing mode (see Japanese Patent Unexamined Publication No. 2010-79250, for example). Some imaging apparatuses each use a rotary encoder coupled with the motor to detect the position and/or rotation number of the motor. For example, in the imaging apparatus having a collapsible prime lens, the rotary encoder is sometimes used to detect the position of the motor that drives the focus lens. Such a rotary encoder rotates in synchronization with the motor, and outputs a pulse signal. A controller of the imaging apparatus counts the number of the pluses output from the rotary encoder, thereby allowing the detection of the position and/or rotation number of the motor.

SUMMARY

An imaging apparatus according to the present disclosure includes: a focus lens, a motor for driving the focus lens, an origin detection unit for detecting an arrival of the focus lens at a reference position, a drive amount detection unit for detecting an amount of drive of the focus lens driven by the motor, and a controller for recognizing a position of the focus lens based on an output from the drive amount detection unit and for controlling the position of the focus lens. The controller receives a detection signal from the origin detection unit during driving the focus lens, and determines an occurrence of step-out of the motor based on both the received detection signal and the position of the focus lens recognized by the controller.

DETAILED DESCRIPTION

Hereinafter, detailed descriptions of embodiments will be made with reference to the accompanying drawings as deemed appropriate. However, descriptions in more detail than necessary will sometimes be omitted. For example, detailed descriptions of well-known items and duplicate descriptions of substantially the same configuration will sometimes be omitted, for the sake of brevity and easy understanding by those skilled in the art. It is noted that the present inventors provide the accompanying drawings and the following descriptions so as to facilitate fully understanding of the present disclosure by those skilled in the art, and the subject matter defined in the claims is not intended to be restricted by the drawings and the descriptions.

FIRST EXEMPLARY EMBODIMENT

1. Configuration

Hereinafter, the configuration of a digital camera will be described with reference to the drawings. The digital camera (an example of electric apparatuses and imaging apparatuses) according to the embodiment is capable of using only a single encoder to determine, for example, step-out of a motor which drives a focus lens.

[1-1. Configuration of Digital Camera]

Figure 1:
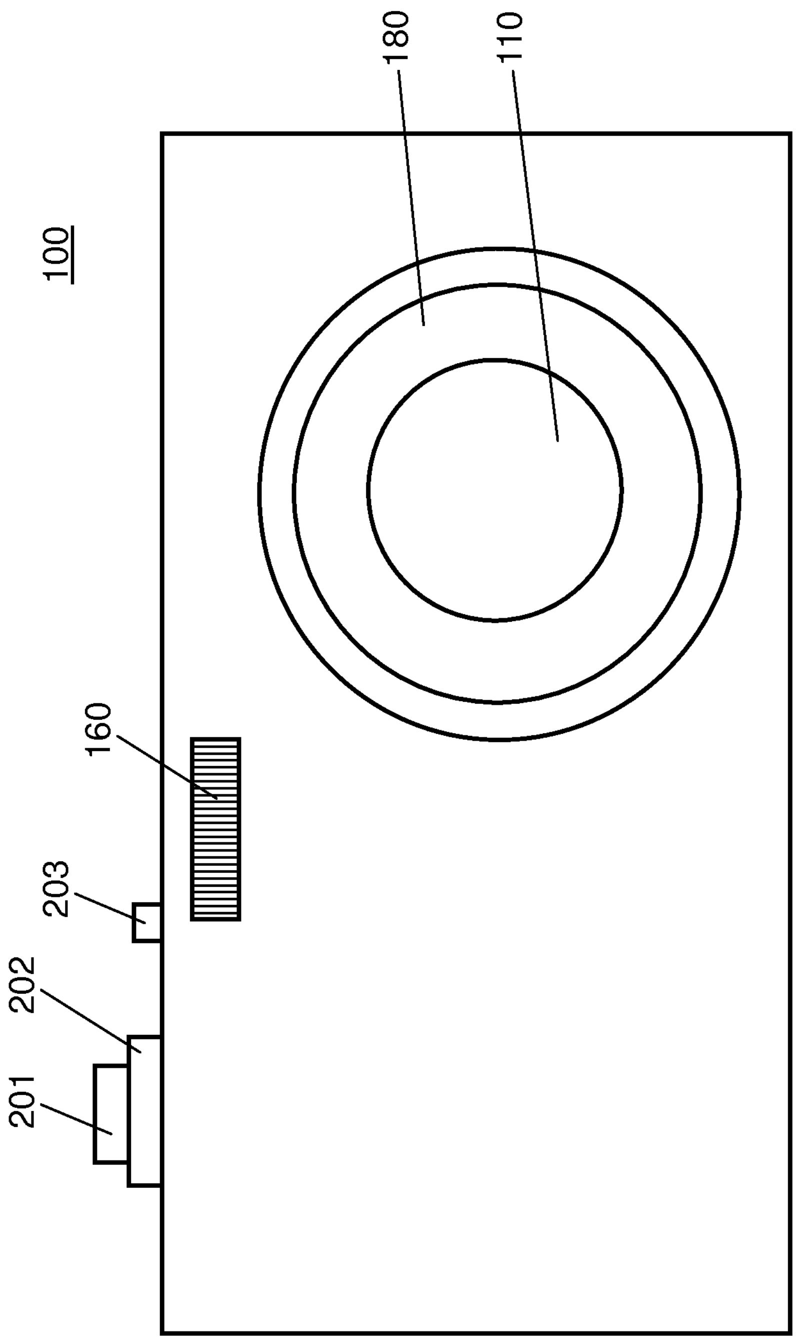
FIG. 1 is a front view of a digital camera according to a first embodiment.

FIG. 1 is a front view of digital camera 100. Digital camera 100 is equipped, on the front face, with flash 160 and lens barrel 180 accommodating optical system 110. Moreover, digital camera 100 is equipped, on the top face, with operation buttons including still-image release button 201, zoom lever 202, and power button 203.

Figure 2:
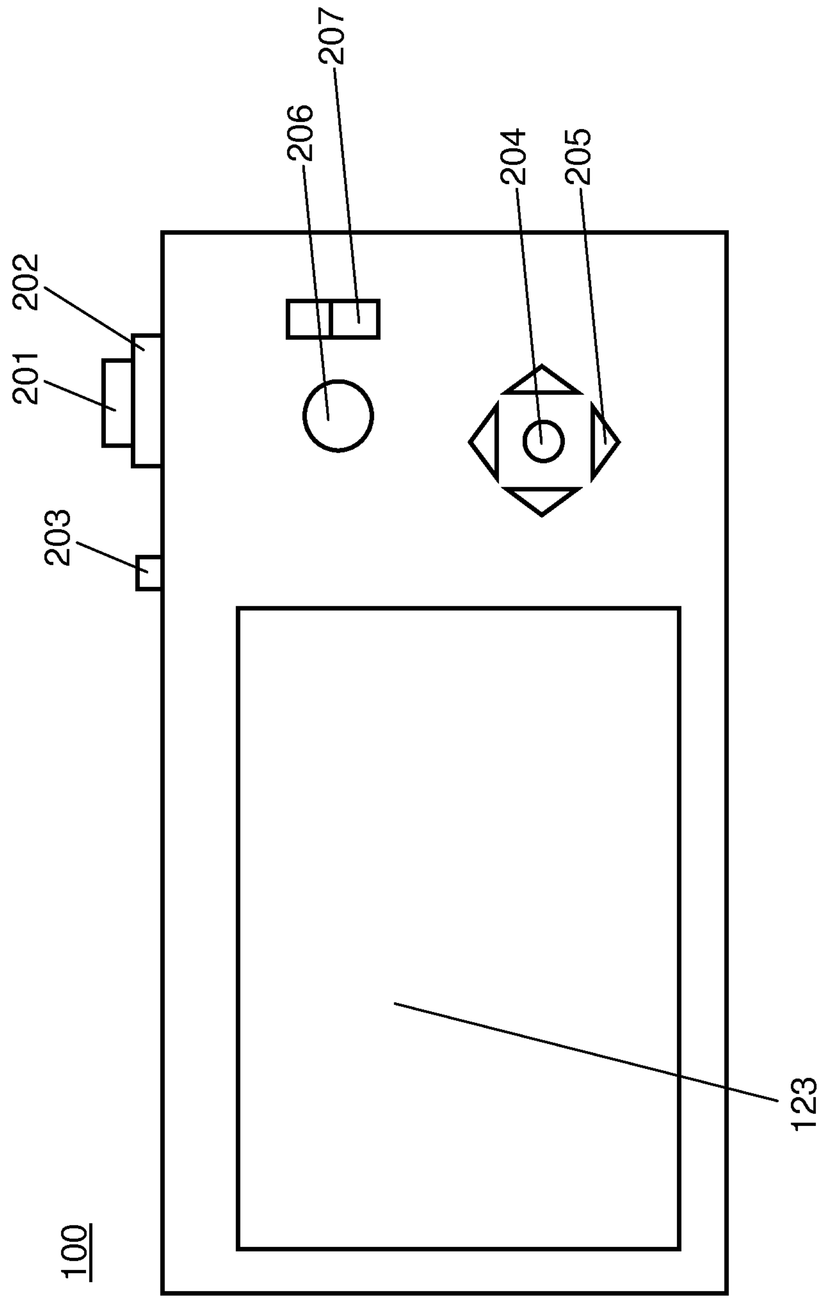
FIG. 2 is a rear view of the digital camera according to the first embodiment.

FIG. 2 is a rear view of digital camera 100. Digital camera 100 is equipped, on the rear face, with liquid crystal display monitor 123 and operation buttons including center button 204, cross button 205, moving-image release button 206, and mode selection switch 207.

Figure 3:
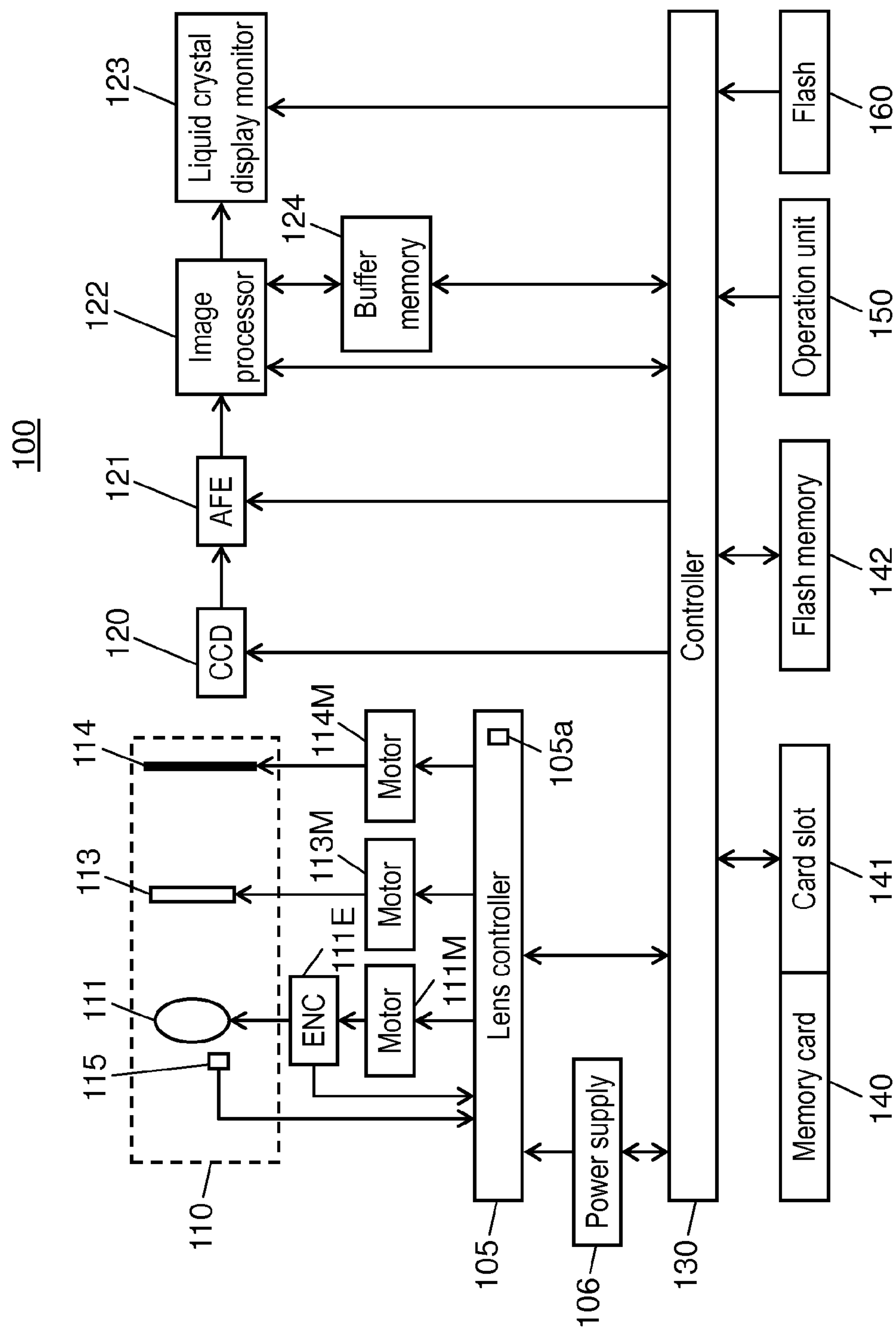
FIG. 3 is a view of an electrical configuration of the digital camera according to the first embodiment.

FIG. 3 is a view of an electrical configuration of digital camera 100. Digital camera 100 images, by using CCD image sensor 120, a subject image which is formed via optical system 110. CCD image sensor 120 forms image data based on the thus-imaged subject image. The image data formed by imaging are subjected to various kinds of image processing in analog front end (AFE) 121 and in image processor 122. The thus-formed image data are recorded in a record medium such as flash memory 142 or memory card 140. In the embodiment, descriptions will be made using a case where the data are recorded in memory card 140, for an example. The image data are displayed on liquid crystal display monitor 123, in accordance with an operation by a user with operation unit 150. Hereinafter, descriptions will be made regarding details of each of the constituent elements shown in FIGS. 1 to 3.

Optical system 110 includes focus lens 111, diaphragm 113, and shutter 114. Although it is not shown in the drawings, optical system 110 may include an optical image stabilizer (OIS) lens for an optical camera-shake correction. Note that various kinds of lenses which configure optical system 110 may be configured with either some lenses or some groups of lenses.

Focus lens 111 is used to adjust a focus state of a subject. Diaphragm 113 is used to adjust an amount of light incident on CCD image sensor 120. Shutter 114 adjusts an exposure time to the light incident on CCD image sensor 120. Focus lens 111 is driven by focus motor 111M. Diaphragm 113 is driven by diaphragm motor 113M. Shutter 114 is driven by shutter motor 114M. Motors 111M to 114M are driven in accordance with control signals transmitted from lens controller 105 (an example of controllers).

Focus motor 111M employs a stepping motor. That is, focus motor 111M rotates its rotary shaft upon applying a pulse voltage or a sinusoidal voltage controlled by lens controller 105.

Focus motor 111M is equipped with one rotary encoder (referred to as "encoder," hereinafter) 111E. Encoder 111E generates a pulse corresponding to the rotation of focus motor 111M. Encoder 111E has the configuration of a commonly-used rotary encoder which includes a light-emitting element, a light-receiving element, and a code wheel in which a plurality of slits are disposed at regular intervals. The code wheel rotates in conjunction with the rotation of focus motor 111M. Encoder 111E detects light output from the light-emitting element and passed through the slits of the code wheel, by using the light-receiving element; the encoder then outputs the detection of the light as a pulse signal. The pulses generated by encoder 111E are inputted to lens controller 105 and the number of the pulses are measured with lens controller 105.

Origin detection unit 115 detects whether or not focus lens 111 passes through "the origin" which is a preset reference position of focus lens 111, and then outputs an origin detection signal which indicates the result of the detection. Origin detection unit 115 is configured with, for example, a photo-interrupter and a light shielding plate (to be described later) that is set in a holding member of focus lens 111.

Lens controller 105 drives motors 111M to 114M in accordance with instructions from controller 130, thereby controlling the motion of optical system 110. Moreover, lens controller 105 is equipped with counter 105*a* in the inside thereof which measures the number of the pulses generated by encoder 111E. Lens controller 105 detects the position of focus lens 111 through use of a drive signal for driving focus lens 111. Furthermore, lens controller 105 refers to a count value of counter 105*a*, thereby monitoring an error between the instructed position of focus lens 111 and the actual position to which the focus lens is driven. In an origin detection operation (to be described later), counter 105*a* is set to a predetermined value (e.g. 0 (zero)), which indicates the origin, when origin detection unit 115 detects that focus lens 111 passes through the origin. Lens controller 105 may be configured with a hard-wired electronic circuit, a microcomputer using a program or the like. That is, lens controller 105 may be configured with a CPU, MPU, FPGA, DSP, ASIC, or the like. Alternately, the lens controller may be configured as a monolithic semiconductor chip together with controller 130 and the like.

Power supply 106 supplies electric power necessary for driving motors 111M, 113M, and 114M of optical system 110, based on the instructions from controller 130. Power supply 106 is capable of supplying electric power to other constituent elements as well of digital camera 100. Power supply 106 is configured with a power supply IC, for example.

CCD image sensor 120 (an example of an imaging unit) images a subject image which is formed via optical system 110, and forms its image data. CCD image sensor 120 is capable of forming the image data of a new frame, every fixed length of time, when digital camera 100 is in a photographing mode.

In AFE 121, the image data, which are read from CCD image sensor 120, are subjected to processes of noise suppression by correlated double sampling, amplification of an input range width of an A/D converter by using an analog gain controller, and A/D conversion by using the A/D converter. After that, AFE 121 outputs the image data to image processor 122.

Image processor 122 applies various processes to the image data output from AFE 121. Such various processes include smear correction, white balance correction, gamma correction, YC conversion, electronic zoom, compression, and decompression; however, they are not limited to these. Image processor 122 stores the thus-processed image information in buffer memory 124. Image processor 122 may be configured with a hard-wired electronic circuit, a microcomputer using a program, or the like. Alternately, the image processor may be configured as a monolithic semiconductor chip together with controller 130 and the like.

Liquid crystal display monitor 123 is disposed on the rear face of digital camera 100. Liquid crystal display monitor 123 displays an image based on the image data processed in image processor 122. Liquid crystal display monitor 123 may include an electrostatic or pressure-sensitive touch panel. That is, it may be configured that the touch panel disposed in liquid crystal display monitor 123 accepts operation instructions by the user.

Controller 130 may be configured with a hard-wired electronic circuit, a microcomputer using a program, or the like. Alternately, the controller may be configured as a monolithic semiconductor chip together with image processor 122 and the like. Controller 130 may be such that a ROM accommodating a control program therein is disposed at either the inside or the outside of controller 130. That is, controller 130 may be configured with a CPU, MPU, FPGA, DSP, ASIC, or the like.

Buffer memory 124 is a storage means which functions as work memory of image processor 122 and controller 130. Buffer memory 124 can be implemented using a dynamic random access memory (DRAM) or the like. Moreover, flash memory 142 functions as internal memory to record the image data, setting information of digital camera 100, and the like.

Card slot 141 is a coupling means to mount memory card 140 in digital camera 100. Card slot 141 is connectable electrically and mechanically to memory card 140. Moreover, card slot 141 may include a function of controlling memory card 140.

Memory card 140 is an external memory equipped with a storage element, such as a flash memory, in the inside thereof. Memory card 140 is capable of recording data such as the image data to be processed in image processor 122.

Operation unit 150 is a generic name for the operation buttons and operation dials which are disposed on the exterior of digital camera 100 and accept operations by the user. For example, the following corresponds to this: still-image release button 201, moving-image release button 206, zoom lever 202, power button 203, center button 204, cross button 205, mode selection switch 207, and the like, which are shown in FIGS. 1 and 2. Upon accepting the operations by the user, operation unit 150 informs controller 130 of various kinds of operation instruction signals.

Still-image release button 201 is a two-step pushbutton having a half-depressing state and a full-depressing state. When still-image release button 201 is half-depressed by the user, controller 130 performs auto focus (AF) control and/or auto exposure (AE) control, and determines conditions of photographing. Subsequently, when still-image release button 201 is full-depressed by the user, controller 130 performs a photographing process. Controller 130 records the image data, which are photographed at the timing of the full-depressing operation, as a still image into memory card 140 or the like. Hereinafter, when simply describing "still-image release button 201 is depressed," it means a full-depressing operation.

Moving-image release button 206 is a pushbutton to instruct start and end of recording of a moving image. Upon depression of moving-image release button 206 by the user, controller 130 starts operation of recording a moving image. Then, upon re-depression of moving-image release button 206, controller 130 ends the operation of recording the moving image.

Zoom lever 202 is an operation member to perform electronic zoom. Upon operation of zoom lever 202 by the user, controller 130 detects the operation and performs the function of electronic zoom.

Power button 203 is a pushbutton for the user to instruct power supply to every part that configures digital camera 100. Upon depression of power button 203 by the user when the power is OFF, controller 130 supplies electric power from power supply 106 to every part configuring digital camera 100 to start to operate. Moreover, upon depression of power button 203 by the user when the power is ON, controller 130 stops supplying the power from power supply 106 to the every part.

Center button 204 is a pushbutton. When digital camera 100 is in a photographing mode or a reproducing mode, upon depression of center button 204 by the user, controller 130 displays a menu screen on liquid crystal display monitor 123. The menu screen is a screen for use in setting of various conditions for photographing and/or reproducing. The information that is set using the menu screen is recorded into flash memory 142. Upon depression of center button 204 with setting items for various conditions having been selected, the center button also functions as a decision button on the items.

Cross button 205 is configured including pushbuttons disposed in the left, right, top, and bottom directions. By depressing any of the pushbuttons of cross button 205, the user can select various items of conditions which are displayed on liquid crystal display monitor 123.

Mode selection switch 207 is a switch to change the mode of digital camera 100 between a photographing mode and a reproducing mode.

2. Operation

[2-1. Origin Detection Operation]

Figure 4:
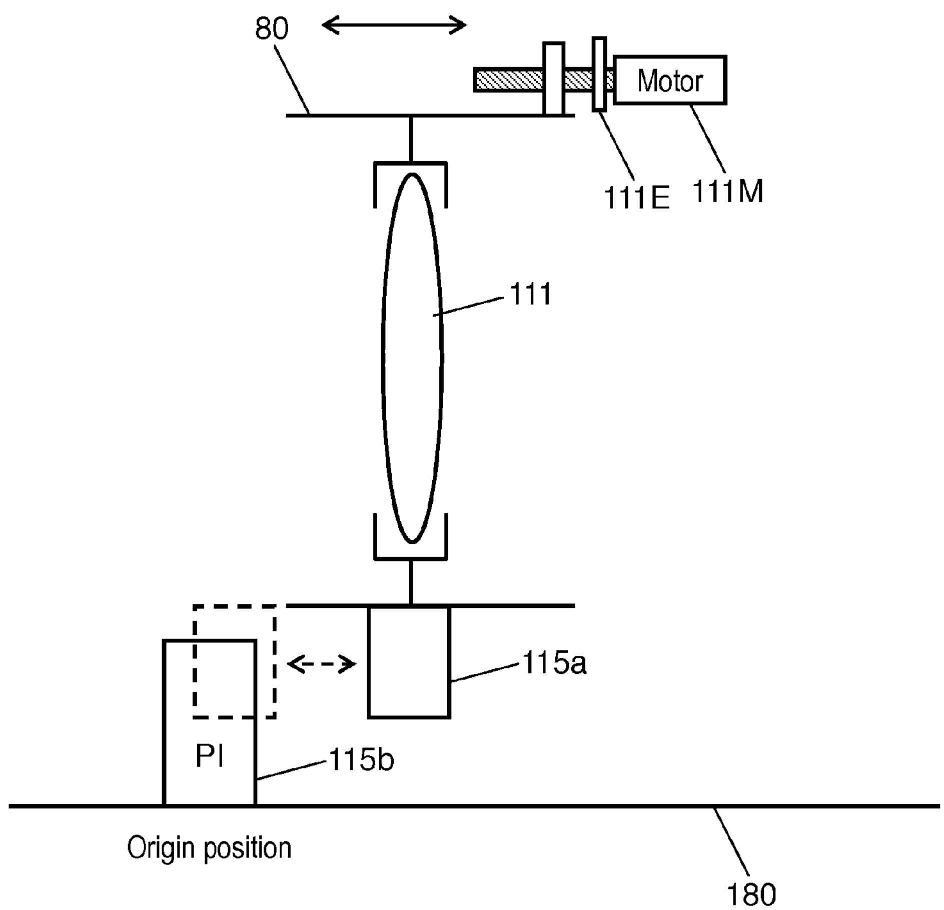
FIG. 4 is a view illustrating detection of the origin of a focus lens.

An operation of digital camera 100 to detect an origin will be described. FIG. 4 is a view of a configuration and operation of origin detection unit 115 that is mainly used in the origin detection operation of digital camera 100.

As shown in FIG. 4, origin detection unit 115 is configured with photo-interrupter 115*b* and light shielding plate 115*a* disposed in holding member 80 of focus lens 111. Holding member 80 holds focus lens 111, and is driven by motor 111M along an optical axis direction of optical system 110. In conjunction with the movement of holding member 80, both focus lens 111 and light shielding plate 115*a* move along the optical axis direction. Photo-interrupter 115*b* is configured with a light-emitting element and a light-receiving element. The photo-interrupter outputs signal "High" when the light-receiving element receives light emitted from the light-emitting element, while outputs signal "Low" when the light-receiving element does not receive the light emitted from the light-emitting element. Photo-interrupter 115*b* is disposed at a predetermined position (a position which gives the origin) in the track of light shielding plate 115*a*, in the inside of lens barrel 180. Accordingly, photo-interrupter 115*b* outputs signal "Low" when light shielding plate 115*a* moves in the inside of photo-interrupter 115*b*, with the plate cutting off the light emitted from the light-emitting element. Photo-interrupter 115*b* outputs signal "High" when light shielding plate 115*a* does not move in the inside of photo-interrupter 115*b*. Detecting such a change of the output of photo-interrupter 115*b*, either from "Low" to "High" or from "High" to "Low," allows the detection of the arrival of focus lens 111 (or motor 111M) at the origin. In other words, the origin of focus lens 111 (or motor 111M) can be set at the position where the output of photo-interrupter 115*b* changes either from "Low" to "High" or from "High" to "Low." The setting of the origin is performed by setting the value of counter 105*a* in lens controller 105 to a predetermined value (e.g. 0 (zero)) which indicates the origin.

In the embodiment, optical system 110 is accommodated in the inside of collapsible lens barrel 180. Lens barrel 180 is accommodated in the inside of the body of digital camera 100 when the power of digital camera 100 is turned OFF. When the power is turned ON, the barrel extends to be in a state of protruding from the body.

Upon turning ON the power of digital camera 100, an initializing process is performed, followed by performing the origin detection operation. In the initializing process, lens barrel 180 is controlled such that its state is changed from being accommodated in the camera body to protruding from the body. In this process, lens 111 included in lens barrel 180 is moved by motor 111M from the accommodation position to a predetermined position.

Figure 5:
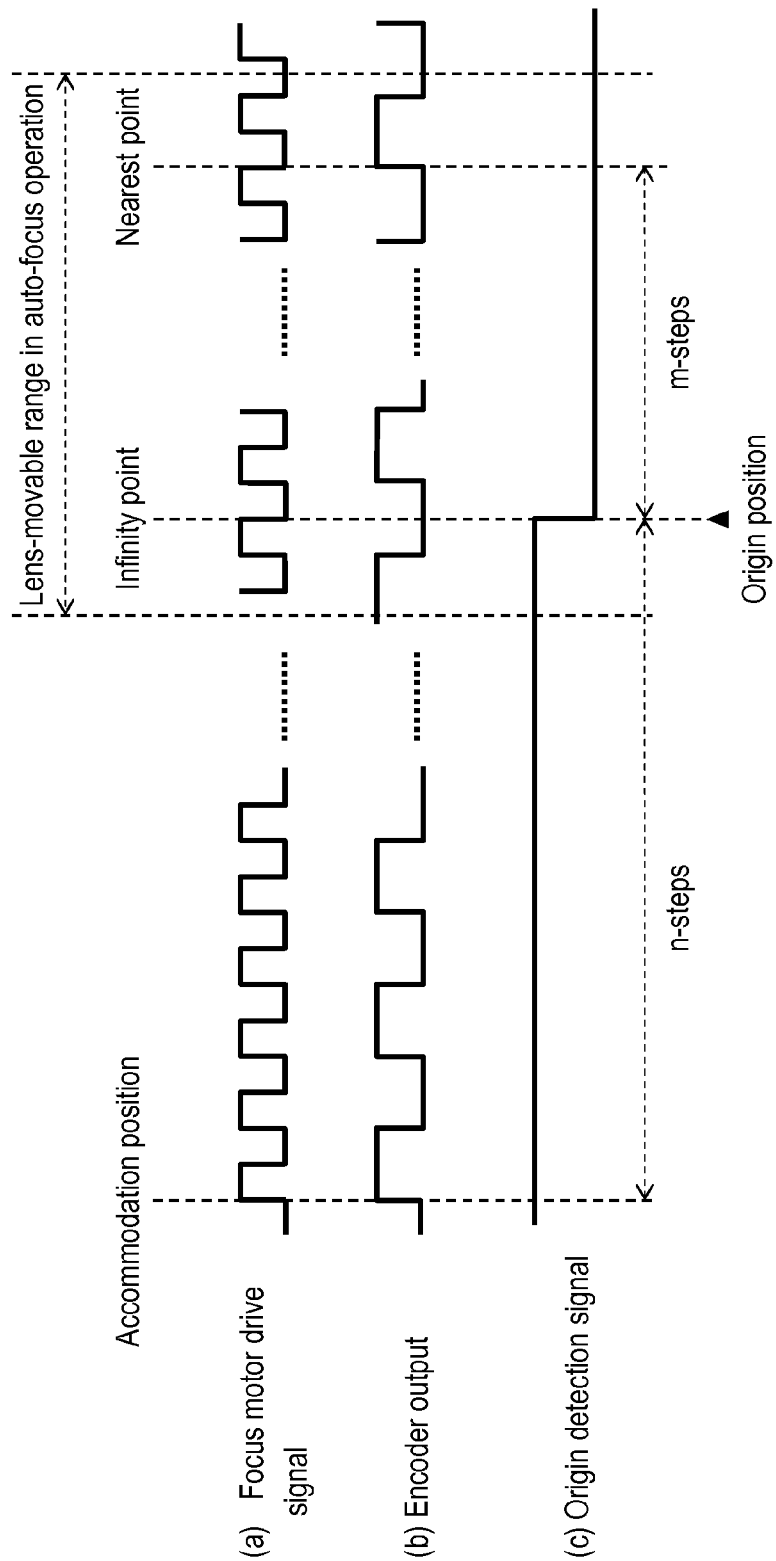
FIG. 5 is a view illustrating an operation of detecting the origin in the digital camera according to the first embodiment.

A description will be made regarding the origin detection operation that is performed in the initializing process of digital camera 100, with reference to FIG. 5. FIG. 5 shows timing charts (a) to (c) which indicate a drive signal of focus motor 111M, an output of encoder 111E, and an origin detection signal of origin detection unit 115, respectively, in the origin detection operation.

Upon turning ON the power of digital camera 100, lens controller 105 outputs the drive signal to focus motor 111M (see FIG. 5 (*a*)). Focus motor 111M is driven to cause focus lens 111 to move along the optical axis. Following the movement by focus motor 111M, light shielding plate 115*a* moves.

At that time, the origin detection signal varies as shown in FIG. 5 (*c*). That is, when light shielding plate 115*a* has yet to reach the position of photo-interrupter 115*b*, photo-interrupter 115*b* outputs signal "High." Upon arrival of light shielding plate 115*a* at the position of photo-interrupter 115*b*, photo-interrupter 115*b* changes the output from "High" to "Low." At the point in time of detecting this change, lens controller 105 sets the value of counter 105*a*, which indicates the position of focus lens 111, to a value (e.g. 0(zero)) indicating the origin.

Encoder 111E outputs a pulse signal as shown in FIG. 5 (*b*), following the rotation of focus motor 111M. Based on the pulse signal received from encoder 111E, lens controller 105 updates the information indicating the position of focus lens 111 by counting up the value of counter 105*a*.

Digital camera 100 stores information, in advance, in flash memory 142, concerning the number of pulses to be applied to focus lens 111 to drive focus lens 111, from the origin to the nearest point and from the origin to the infinity point. Lens controller 105 can refer to both the value stored in flash memory 142 and the value of counter 105*a*, thereby determining the number of the pulses which have to be applied to focus lens 111 to move from the current position to either the nearest point or the infinity point.

Note that, in the embodiment, the origin (the position of photo-interrupter 115*b* in the inside of lens barrel 180) is set within the range in which focus lens 111 moves in operation of auto-focusing. The reason for setting the origin in this way lies in that focus lens 111 has to pass through the origin when a focus state cannot be obtained in operation of auto-focusing. Note that the range in which focus lens 111 moves in the operation of auto-focusing is set including the nearest point and the infinity point, with the range having some outside margins beyond these points (see FIG. 5). In the embodiment, the origin (i.e. the position of photo-interrupter 115*b* in the inside of lens barrel 180) is set at the infinity point of focus lens 111, as an example. This is because that the setting of the origin at the infinity point allows a smaller distance of the movement of the focus lens to the origin, in the origin detection operation in the initial operation, which results in a rapid completion of the origin detection operation.

[2-2. Step-Out Determination Process]

Figure 6:
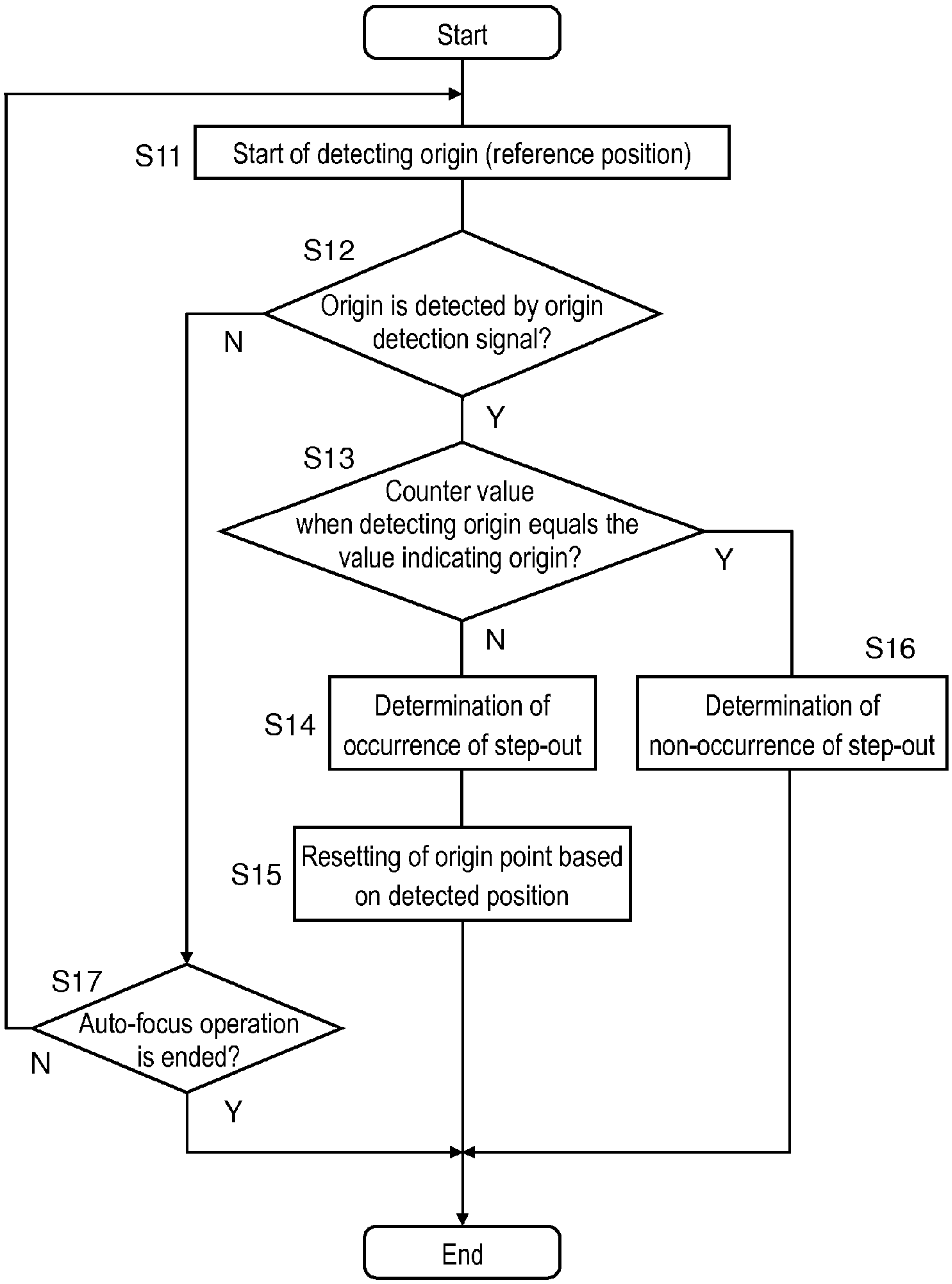
FIG. 6 is a flowchart of a step-out determination process of the digital camera according to the first embodiment.

A step-out determination process of digital camera 100 will be described. FIG. 6 is a flowchart of the step-out determination process of digital camera 100. The step-out determination process is performed in operation of auto-focusing.

Upon starting the auto-focusing operation, lens controller 105 performs the origin detection based on the origin detection signal that is received from origin detection unit 115 (S11). That is, when the value of the origin detection signal changes either from "Low" to "High" or from "High" to "Low," lens controller 105 determines that the origin is detected.

When the origin is not detected (No, in Step S12), the lens controller continues to perform the origin detection (S11) based on the received origin detection signal, until either the origin is detected (S12) or the auto focus operation is ended (S17).

When the origin is detected (Yes, in Step S12), lens controller 105 determines whether or not the value of counter 105*a* at the time of the detection is equal to the predetermined value (e.g. 0 (zero)) that indicates the origin (S13).

When the value of counter 105*a* is equal to the predetermined value (e.g. 0 (zero)) (Yes, in Step S13), lens controller 105 determines that step-out does not occur (S16). Note that, there is no need for the value of counter 105*a* to accurately equal the predetermined value. As long as the difference between these values lies in a predetermined range (for example, within an error of a few pulses), the result of the determination is that the both values are identical.

On the other hand, when the value of counter 105*a* is not equal to the predetermined value (No, in Step S13), lens controller 105 determines that the step-out occurs (S14). In this case, lens controller 105 sets (resets) the value of counter 105*a* to the predetermined value (e.g. 0 (zero)) (S15).

As described above, in the embodiment, the occurrence or non-occurrence of the step-out is determined by referring to the value of the counter at the time of detecting the origin by using origin detection unit 115. Such a method of detecting the step-out allows only the single encoder to perform the accurate detection of the step-out. For this reason, the component count of the encoder can be reduced, allowing a downsizing of digital camera 100. Moreover, because the determination of the step-out is performed in operation of auto-focusing, it makes it possible to automatically determine the step-out.

3. Advantages and Others

Digital camera 100 according to the embodiment includes: focus lens 111, focus motor 111M to drive focus lens 111, origin detection unit 115 to detect that focus lens 111 reaches the origin (reference position), encoder 111E (a drive amount detection unit) to detect the amount of drive of the focus lens by focus motor 111M, and lens controller 105 to recognize the position of focus lens 111 based on the output from encoder 111E and to control the position of focus lens 111. Lens controller 105 receives the origin detection signal from origin detection unit 115 during driving of focus lens 111, and then determines whether or not the step-out of focus lens 111 occurs based on both the received signal and the position of focus lens 111 (the value of counter 105*a*) which the lens controller recognizes.

With this configuration, only one encoder can be used to accurately determine the step-out of the focus motor by detecting the position of the focus lens, i.e. the position of the motor, resulting in a downsizing of the apparatus.

Moreover, the origin (reference position) may be set at a predetermined position within the range in which focus lens 111 is movable in focusing operation. For example, the origin may be set at a position which lies closer to the infinity point than the midpoint between the nearest and infinity points of focus lens 111 (see FIG. 7 (*a*)).

Lens controller 105 can determine the occurrence of the step-out of focus motor 111M when there exists a discrepancy between the two positions, that is, the position of focus lens 111 indicated by the origin detection signal received from origin detection unit 115 and the position of focus lens 111 (the value of counter 105*a*) recognized by lens controller 105 at the time when the recognized position indicates the arrival of focus lens 111 at the origin.

When determining the occurrence of the step-out of focus motor 111M, lens controller 105 may set the position of the focus lens recognized by lens controller 105 at the origin.

4. Other Embodiments

As described above, the first embodiment has been described as an exemplification of the technology disclosed in the present application. However, the technology according to the present disclosure is not limited to this, and is also applicable to embodiments that are subjected, as appropriate, to various changes and modifications, replacements, additions, omissions, and the like. Moreover, the technology disclosed herein also allows another embodiment which is configured by combining the appropriate constituent elements in the first embodiment described above. Hereinafter, other embodiments will be exemplified.

Figure 7:
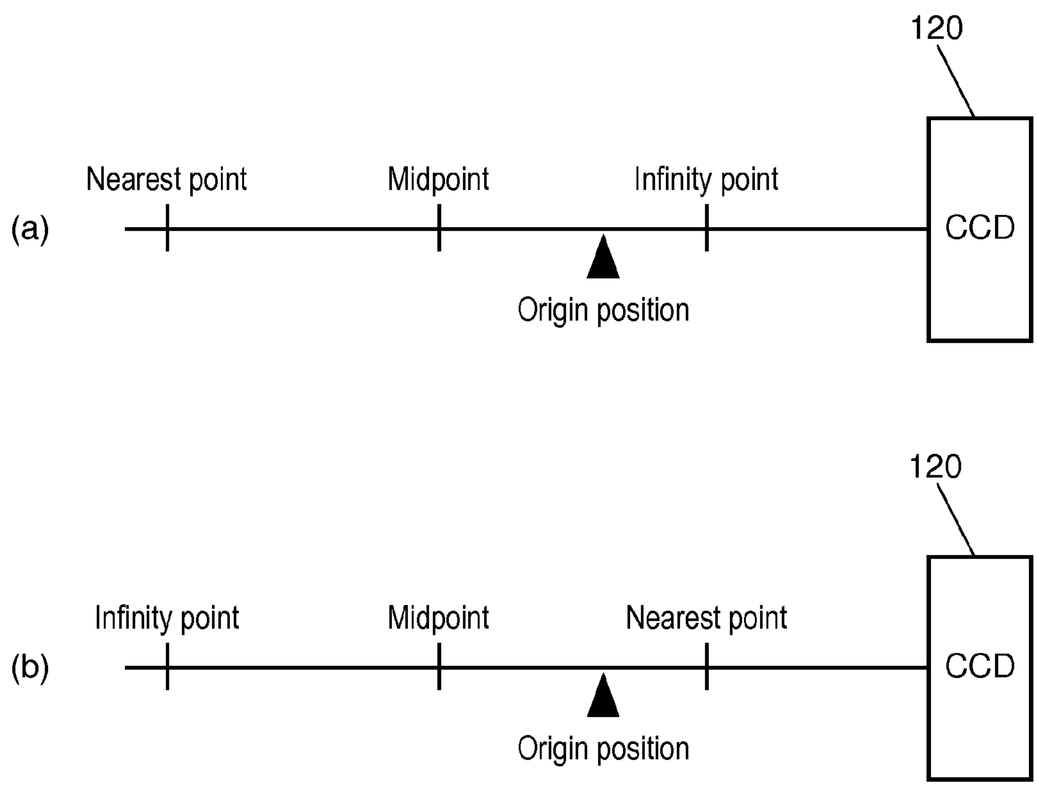
FIG. 7 is a view of an example of a positional relation among a nearest point, an infinity point, and the origin of the focus lens.

In the embodiments described above, the origin is set at the position corresponding to the infinity point; however, the origin is not limited to this. The origin may be set at a position in the vicinity of the position corresponding to the infinity point. Alternately, the origin may be set at any position closer to the infinity point than the midpoint between the nearest point and the infinity point. Such a setting of the origin at the position closer to the infinity point gives an advantage of shortening the time necessary for the origin detection operation in the initialization. However, this advantage is obtained provided that optical system 110 is designed such that the infinity point of the focus lens is positioned closer to CCD image sensor 120 than the nearest point as shown in FIG. 7 (*a*). Conversely, when optical system 110 is designed such that the nearest point of the focus lens is positioned closer to CCD image sensor 120 than the infinity point as shown in FIG. 7 (*b*), the origin may be set at any position closer to the nearest point than the midpoint between the infinity point and the nearest point. Such a setting of the origin in this way gives the advantage of shortening the time necessary for the origin detection operation in the initialization, even in the case where the infinity and nearest points of the focus lens have the positional relation shown in FIG. 7 (*b*).

In the embodiment described above, the configuration of the digital camera has been described which accommodates the optical system; however, the spirit of the embodiment described above is also applicable to a lens-interchangeable camera. In this case, an interchangeable lens (i.e. a lens barrel) includes: an optical system as shown in the embodiment described above, a motor to drive the optical system, and a lens controller to control both an encoder, which counts the rotation number of the motor, and each part of the inside of the interchangeable lens. Then, the lens controller may perform such a control as described in the aforementioned embodiments.

Moreover, in the embodiments, the origin detection is performed during an operation of auto focusing, and then the step-out determination is made based on the result of the origin detection. However, even in an operation of manual focusing, the same process as shown in FIG. 6 may be performed to determine the step-out.

In the embodiments described above, the descriptions have been made using an example of the digital camera as an electronic apparatus equipped with a motor controller.

However, the spirit of the control according to the present disclosure is also applicable to other apparatuses (such as electronic apparatuses and industrial machines) as long as they detect positions of their motors and driven parts through use of encoders. For example, the spirit of the power control according to the present disclosure is also applicable to position control of a motor used in a robot. That is, the spirit of the control according to the present disclosure is applicable to a full range of apparatuses in which positions of their motors and driven parts are detected through use of encoders.

In the embodiments described above, the origin is detected based on the origin detection signal (S12) and, after that, the occurrence or non-occurrence of the step-out is determined by determining whether or not the value of counter 105*a* is equal to the predetermined value indicating the origin (S13). However, the method for determining the occurrence or non-occurrence of the step-out is not limited to this. For example, during driving of focus lens 111, the position of focus lens 111 is specified by referring to the value of counter 105*a*. Then, the actual value of the origin is compared with the value of the origin detection signal that should be primarily output for the specified position in the case without step-out. When the comparison shows that these values are not identical to each other, it can be determined that the step-out occurs. For example, at the position of focus lens 111 where the origin detection signal should-be-primarily-output is "High" (or "Low"), when the actual origin detection signal is "Low" (or "High"), it can be determined that the step-out occurs.

In the embodiments, when the occurrence of the step-out is determined, the process of resetting the origin is performed (S15). In addition to this process, another auto-focus process may be newly performed. In this case, in the another auto focus process, when the occurrence of the step-out is determined again, the processes of resetting the origin and auto-focusing may be performed again. If the occurrence of the step-out is still repeatedly determined even though the resetting of the origin has been repeated predetermined times, the auto-focus operation may be halted and then a message may be displayed, on liquid crystal display monitor 123, which shows the occurrence of an error.

As described above, the embodiments have been described to exemplify the technology according to the present disclosure. To that end, the accompanying drawings and the detailed descriptions have been provided.

Therefore, the constituent elements described in the accompanying drawings and the detailed descriptions may include not only essential elements for solving the problems, but also inessential ones for solving the problems which are described only for the exemplification of the technology described above. For this reason, it should not be acknowledged that these inessential elements are considered to be essential only on the grounds that these inessential elements are described in the accompanying drawings and/or the detailed descriptions.

Moreover, because the aforementioned embodiments are used only for the exemplification of the technology disclosed herein, it is to be understood that various changes and modifications, replacements, additions, omissions, and the like may be made to the embodiments without departing from the scope of the appended claims or the scope of their equivalents.

The spirit according to the present disclosure is applicable to apparatuses in which positions of their motors and driven parts are detected through use of encoders, with the apparatuses including digital still cameras, video cameras, mobile telephones, smartphones, mobile personal computers, and robots.

What is claimed is:

1. An imaging apparatus comprising:

a focus lens;

a motor for driving the focus lens;

an origin detection unit for detecting an arrival of the focus lens at a reference position;

a drive amount detection unit for detecting an amount of drive of the focus lens driven by the motor; and a controller for recognizing a position of the focus lens based on an output from the drive amount detection unit, and for controlling the position of the focus lens, wherein the controller:

(i) determines the occurrence of the step-out of the motor when a difference between the position of the focus lens detected by the origin detection unit and the position of the focus lens recognized by the controller is out of a predetermined range, and (ii) only when the occurrence of the step-out of the motor is determined, sets the position of the focus lens recognized by the controller to the reference position.

2. The imaging apparatus according to claim 1, wherein the reference position is set at a predetermined position within a range in which the focus lens is movable in focusing operation.

3. The imaging apparatus according to claim 2, wherein the reference position is set at a position closer to an infinity point of the focus lens than a midpoint between the infinity point and a nearest point of the focus lens.

* * * * *